United States Patent [19]

Sturtz, Jr.

[11] 4,022,259

[45] May 10, 1977

[54] TREE SHEAR

[75] Inventor: Charles Robert Sturtz, Jr., Romulus, Mich.

[73] Assignee: Clark Equipment Company, Buchanan, Mich.

[22] Filed: Mar. 24, 1976

[21] Appl. No.: 670,034

[52] U.S. Cl. .............................. 144/34 E; 144/3 D; 144/309 AC
[51] Int. Cl.² ........................................ A01G 23/02
[58] Field of Search ............... 144/34 E, 34 R, 3 D, 144/309 AC

[56] References Cited

UNITED STATES PATENTS

| 3,540,501 | 11/1970 | Jonsson | 144/34E |
| 3,854,510 | 12/1974 | Matlik | 144/34 R |
| 3,862,652 | 1/1975 | Johnson | 144/34 E |
| 3,920,057 | 11/1975 | Hamilton et al. | 144/34 E |

Primary Examiner—Donald R. Schran
Attorney, Agent, or Firm—Harry G. Thibault

[57] ABSTRACT

A tree shear having two movable shear arms pivoted about a common horizontally disposed axis. Shear blades are rigidly connected at the lower ends of the shear arms and arranged in confronting relation to shear the tree when they are moved toward each other by a power actuator.

5 Claims, 6 Drawing Figures

TREE SHEAR

BACKGROUND OF THE INVENTION

1. Field of the Invention

This invention relates to power operated shears for severing standing trees.

2. Description of the Prior Art

Power operated shears are known and have been used for severing standing trees, frequently in conjunction with a timber harvester machine or as a part of a feller buncher machine. Such power operated shears supplant manual and manually manipulated saws, axes, wedges and other tools formerly used for the purpose of felling trees.

The present invention provides a tree shear which adapts readily to trees which are not vertical or to a situation in which the shear or the machine carrying the shear is not lined up accurately with the tree to be severed. The present invention provides a rugged tree shear which is relatively easy to construct and to maintain, and also provides other advantages which are pointed out hereinafter.

SUMMARY OF THE INVENTION

In a shear according to the present invention a pair of vertically disposed shear arms are pivotally mounted about a common horizontally disposed axis. Such axis may be formed by a pin secured to a vertically disposed support structure. A pair of horizontally disposed shear blades are rigidly connected at the lower ends of the two shear arms and are arranged in confronting relation to each other to shear a tree when they are moved toward each other. A remotely operated power device is provided for selectively moving the shear arms and the shear blades thereon away from and toward each other during operation.

DESCRIPTION OF THE PREFERRED EMBODIMENT

Figure 1:
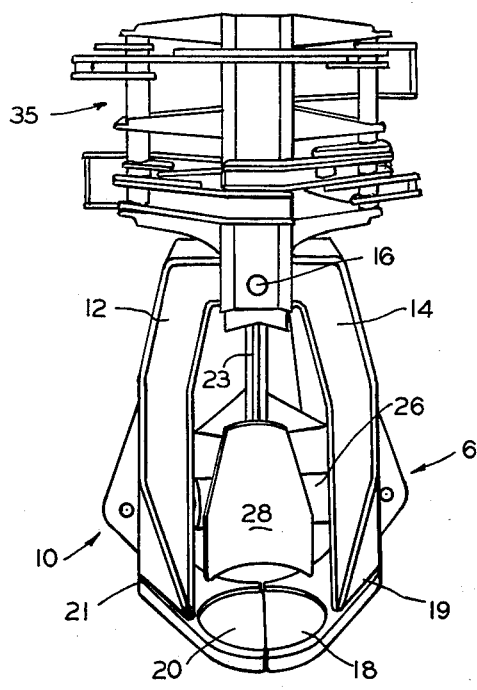
FIG. 1 is a front elevational view of the tree shear of the present invention along with some additional associated structure.

In the first four figures of the drawing the tree shear of the present invention is indicated generally by the numeral 10. The shear 10 includes shear arms 12 and 14 which are pivotally suspended from a common axis indicated at 16.

At the bottom, each shear arm is provided with a shear blade which is indicated at 18 for arm 14 and at 20 for arm 12. The shear blades are horizontally disposed and preferably are welded along joints indicated at 19 and 21 in FIG. 1 to their respective shear arms. The shear blades can be readily replaced when necessary by cutting off the old ones and welding on new ones.

Figure 5:
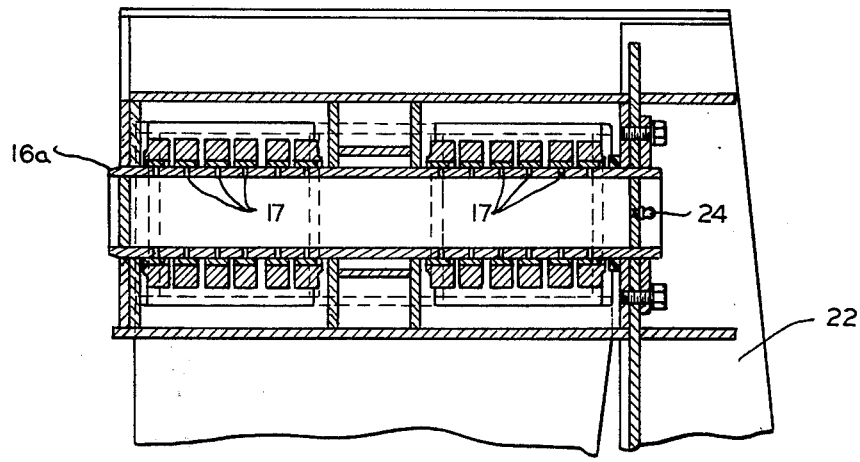
FIG. 5 is a fragmentary view at the location indicated at 5 in FIG. 2.

The axis 16 is formed by a hollow pin 16a shown in FIG. 5 which also shows the piano hinge structure by which the two arms 12 and 14 are pivotally mounted on pin 16a. The pin 16a is secured to support structure 22 and as shown is provided with a grease fitting 24 whereby the hollow pin 16a is entirely filled with grease in order to lubricate the piano hinge connection through a plurality of openings 17 through pin 16a.

In order to move arms 12 and 14 apart to the shear open position shown in FIG. 3, and then back again so that the shear blades 18 and 20 come together as in FIG. 1 in order to shear a tree, a power actuator 26 is provided. As shown, this is a double acting piston and cylinder type hydraulic actuator or linear motor 26 which is remotely controlled to extend the actuator to move the arms to the position of FIG. 3 and contract the actuator again to move the arms and blades to the closed position of FIG. 1.

Figure 3:
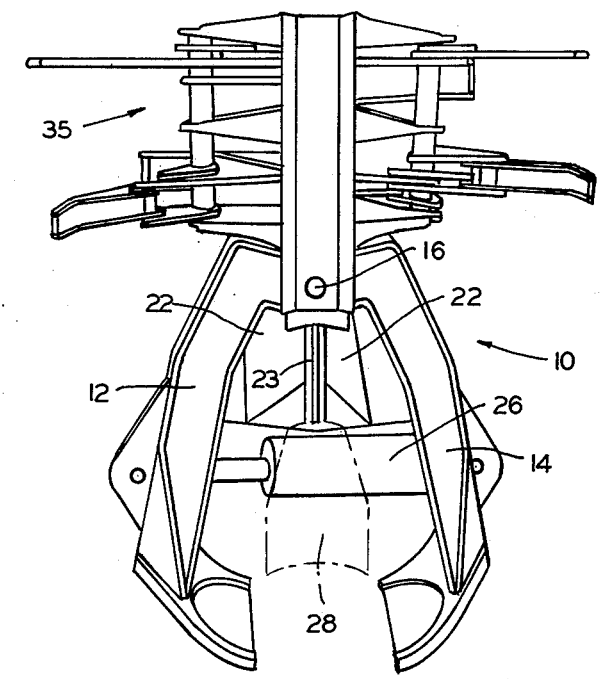
FIG. 3 is a front elevational view the same as FIG. 1 except with the shear open.

In order to protect the actuator 26 from being damaged by contact by a tree which is to be sheared or is being sheared a guard 28 is provided, such guard being secured to the support structure 22 by means of a bracket structure 23 which is secured to and forms a part of support structure 22 and extends above and below actuator 26. In FIG. 3 the guard 28 has been shown in phantom in order to provide a better view of the actuator 26.

Figure 6:
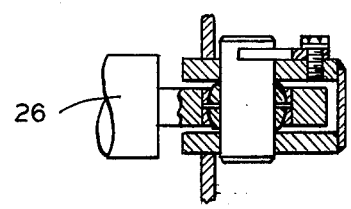
FIG. 6 is a fragmentary view at the location indicated at 6 in FIG. 1.

FIG. 6 of the drawing shows a fragmentary view in section of the pivot connection at one end of the actuator 26, specifically the connection indicated at 6 in FIG. 1. There is a similar pivot connection at the other end of the actuator, and thus the single actuator 26 is able to operate both shear arms.

Figure 4:
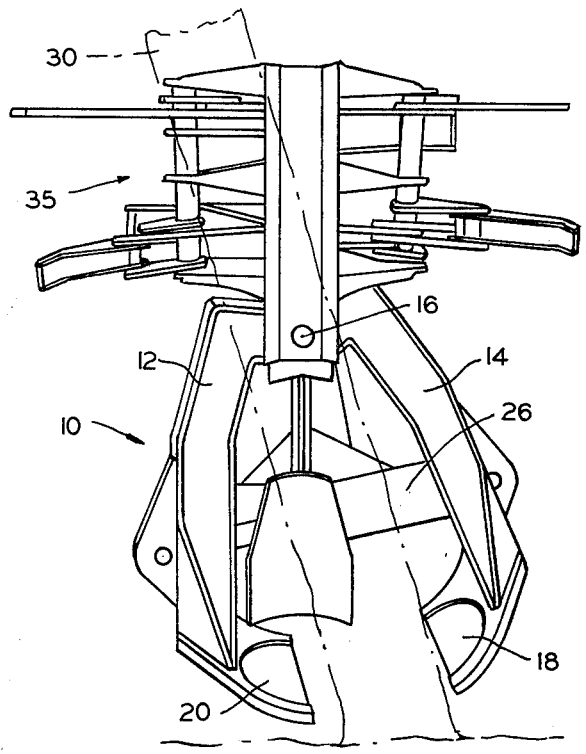
FIG. 4 is the same as FIG. 3 except showing how the shear can pivot laterally to accommodate misalignment of the tree to be sheared.

Moreover, as a result of the common pivot of the two arms about axis 16, shear 10 is enabled to adapt readily to a tree which is not in longitudinal alignment with the shear or which is at an angle with respect to the shear as illustrated by the tree indicated by the dashed line 30 in FIG. 4. As shown in FIG. 4 the arms 12 and 14 have pivoted about axis 16 to the right as seen in the drawings, to adapt to a tree which is off-center with respect to the tree shear 10. The shear 10 operates the same in this position as in FIGS. 1 and 3, that is, contracting actuator 26 causes the blades 18 and 20 to come together and shear off the tree.

It will be appreciated that support structure 22 preferably is connected to a tree harvester or forms a part of some other machine such as a feller buncher. The first four figures of the drawing show a grapple assembly which is indicated generally by the numeral 35 which is carried by support structure 22 but such grapple assembly does not form a part of the present invention.

Figure 2:
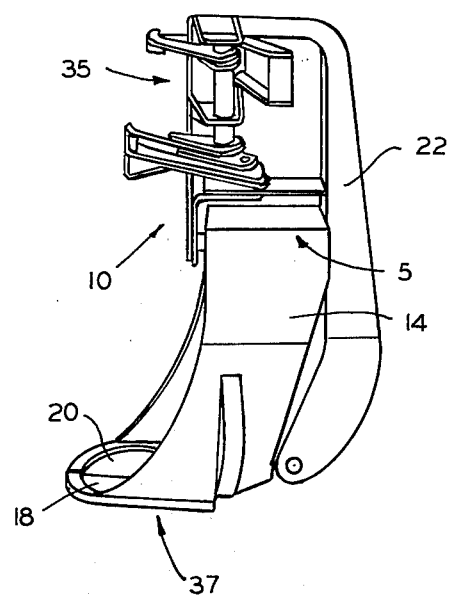
FIG. 2 is a side elevational view of the same structure.

One of the advantages of the present invention is its small foot print, that is, the area of the bottom of the shear looking in the direction of the arrow 37 in FIG. 2 for example. Such foot print or area is relatively small so that there is a minimum of interference with the shear by snow or other material or obstructions which may be around the foot of the tree to be sheared. The present shear is advantageous for cutting trees near the ground.

While I have illustrated and described herein the best mode contemplated for carrying out my invention, modifications may be made. Accordingly, it should be understood that I intend to cover by the appended claims all such modifications which fall within the true spirit and scope of my invention.

I claim:

1. A timber shear comprising a support structure, a pair of shear arms symmetrically disposed on opposite sides of a horizontal pivot axis provided at a lower end of the support structure, the shear arms extending downwardly from the support structure in substantial vertical alignment therewith, each of the shear arms having its upper end pivotally mounted on opposite sides of the pivot axis, respective lower ends of the shear arms having a pair of horizontally disposed shear blades protruding forwardly of the shear arms and rigidly connected thereto, the shear blades arranged in confronting arrangement with each other to shear a tree when they are moved toward each other, and actuating means mounted on the shear arms and substantially underlying the pivot axis thereof, the actuating means disposed between the pivot axis and the shear blades, said means selectively moving the shear arms and the shear blades thereon away from and toward each other.

2. A timber shear as in claim 1 in which said last named means is a linear actuator located between the said arms and pivotally connected to the respective arms at each end of the actuator.

3. A timber shear as in claim 2 including a protective structure for the said actuator rigidly connected to the said support structure and located between said actuator and a tree which is between said blades.

4. A timber shear as in claim 1 in which the said last named means includes a double acting linear hydraulic actuator located between and pivotally connected at its ends to the respective shear arms.

5. A timber shear as claimed in claim 1 wherein the actuating means is transverse to the pivot axis of the shear blades.

* * * * *